United States Patent
Yokota et al.

(10) Patent No.: US 7,815,996 B2
(45) Date of Patent: *Oct. 19, 2010

(54) LOW GLOSS AND LOW HAZE LAMINATED POLYESTER FILM INCLUDING TALC AND METHOD FOR PREPARING SAME

(75) Inventors: Nao Yokota, Saunderstown, RI (US); Doug Bower, Charlestown, RI (US); Steven Sargeant, Kingston, RI (US); Bonnie Adams, Charlestown, RI (US); Yijun Ye, New York City, NY (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/594,231

(22) Filed: Nov. 8, 2006

(65) Prior Publication Data

US 2007/0110959 A1    May 17, 2007

Related U.S. Application Data

(63) Continuation-in-part of application No. 10/685,263, filed on Oct. 14, 2003, now Pat. No. 7,655,291.

(51) Int. Cl.
*B32B 7/02* (2006.01)
*B32B 15/08* (2006.01)
*B32B 15/09* (2006.01)
*B32B 27/20* (2006.01)
*B32B 27/36* (2006.01)

(52) U.S. Cl. .......... 428/212; 428/328; 428/330; 428/331; 428/457; 428/458; 428/480; 428/910

(58) Field of Classification Search .............. None
See application file for complete search history.

(56) References Cited

U.S. PATENT DOCUMENTS

| 3,154,461 | A |   | 10/1964 | Johnson |
| 3,821,156 | A |   | 6/1974  | Farrar  |
| 4,375,494 | A | * | 3/1983  | Stokes ............... 428/323 |
| 4,399,179 | A |   | 8/1983  | Minami et al. |
| 5,391,429 | A |   | 2/1995  | Otani et al. |
| 5,521,002 | A |   | 5/1996  | Sneed |
| 5,648,159 | A | * | 7/1997  | Sato ................ 428/327 |

(Continued)

FOREIGN PATENT DOCUMENTS

EP    0490704    6/1992

(Continued)

OTHER PUBLICATIONS

International Search Report mailed Apr. 17, 2008, directed at International Application No. PCT/US07/084082; 11 pages.

(Continued)

*Primary Examiner*—Vivian Chen
(74) *Attorney, Agent, or Firm*—Morrison & Foerster LLP

(57) ABSTRACT

A polyester film that possesses both reduced gloss and reduced haze is achieved. The film includes at least one sub layer including talc and at least one core layer. The surface layer has a lower melting point temperature than the core layer.

9 Claims, 2 Drawing Sheets

U.S. PATENT DOCUMENTS

| | | | |
|---|---|---|---|
| 5,811,197 | A | 9/1998 | Nishiyama et al. |
| 5,919,536 | A * | 7/1999 | Bennett et al. ............. 428/35.5 |
| 6,174,943 | B1 | 1/2001 | Matsumoto et al. |
| 6,326,461 | B1 | 12/2001 | Giroux et al. |
| 6,329,451 | B2 | 12/2001 | Matsumoto et al. |
| 6,358,604 | B1 | 3/2002 | Peiffer et al. |
| 6,376,042 | B1 * | 4/2002 | Peiffer et al. ................ 428/141 |
| 6,420,019 | B1 | 7/2002 | Peiffer et al. |
| 6,423,401 | B2 | 7/2002 | Peiffer et al. |
| 6,428,882 | B1 | 8/2002 | Peiffer et al. |
| 6,458,880 | B1 | 10/2002 | Onder et al. |
| 6,500,890 | B2 | 12/2002 | Edwards et al. |
| 6,528,144 | B2 | 3/2003 | Peiffer et al. |
| 6,573,359 | B2 | 6/2003 | Nichols et al. |
| 6,627,295 | B2 | 9/2003 | Peiffer et al. |
| 6,709,731 | B2 * | 3/2004 | Murschall et al. ........... 428/141 |
| 6,727,306 | B2 | 4/2004 | Edwards et al. |
| 7,141,293 | B2 * | 11/2006 | Peiffer et al. ................ 428/141 |
| 2002/0068158 | A1 | 6/2002 | Peiffer et al. |
| 2002/0068159 | A1 | 6/2002 | Peiffer et al. |
| 2002/0071945 | A1 | 6/2002 | Peiffer et al. |
| 2003/0054129 | A1 | 3/2003 | Murschall et al. |
| 2003/0064195 | A1 * | 4/2003 | Murschall et al. ........... 428/141 |
| 2003/0087105 | A1 | 5/2003 | Murschall et al. |
| 2003/0108754 | A1 | 6/2003 | Murschall et al. |
| 2003/0157352 | A1 | 8/2003 | Murschall et al. |
| 2004/0040640 | A1 | 3/2004 | Bordes |
| 2005/0079342 | A1 * | 4/2005 | Ye ............................ 428/331 |
| 2006/0008638 | A1 | 1/2006 | Kiehne et al. |
| 2007/0110959 | A1 | 5/2007 | Yokota et al. |

FOREIGN PATENT DOCUMENTS

| | | |
|---|---|---|
| EP | 1176163 | 1/2002 |
| JP | 2002-200724 | 7/2002 |
| WO | WO-03/035726 | 5/2003 |

OTHER PUBLICATIONS

European Search Report dated Feb. 17, 2005, directed to EP Application No. 04 29 2424.1; 2 pages.

Ye, Y., U.S. Office Action mailed May 6, 2005, directed to U.S. Appl. No. 10/685,263; 8 pages.

Ye, Y., U.S. Office Action mailed Nov. 30, 2005, directed to U.S. Appl. No. 10/685,263; 8 pages.

Ye, Y., U.S. Office Action mailed Nov. 1, 2006, directed to U.S. Appl. No. 10/685,263; 8 pages.

Ye, Y., U.S. Office Action mailed Jun. 1, 2007, directed to U.S. Appl. No. 10/685,263; 8 pages.

Ye, Y., U.S. Office Action mailed Jul. 2, 2007, directed to U.S. Appl. No. 10/685,263; 7 pages.

Ye, Y., U.S. Office Action mailed Dec. 11, 2007, directed to U.S. Appl. No. 10/685,263; 6 pages.

Ye, Y., U.S. Office Action mailed Jun. 12, 2008, directed to U.S. Appl. No. 10/685,263; 13 pages.

Ye, Y., U.S. Office Action mailed Jan. 27, 2009, directed to U.S. Appl. No. 10/685,263; 13 pages.

EP Office Action dated May 3, 2010 directed to related EP Application No. 04 292 424.1; 4 pages.

Japanese Notice of Reasons for Rejection mailed Aug. 3, 2010, directed to Japanese Patent Application No. 2004-298932; 11 pages.

* cited by examiner

LOW GLOSS AND LOW HAZE LAMINATED POLYESTER FILM INCLUDING TALC AND METHOD FOR PREPARING SAME

CROSS-REFERENCE TO RELATED APPLICATION

This application is a continuation-in-part application of U.S. Ser. No. 10/685,263, filed Oct. 14, 2003, U.S. Pat. No. 7,655,291.

TECHNICAL FIELD

This invention relates to a polyester film and, more particularly, relates to a low gloss and low haze laminated polyester film containing talc and a method for preparing the same.

BACKGROUND

Translucent and semi-gloss films are widely used in industry. There are different ways to obtain the desired properties in such films. For example, a film can be made semi-gloss by casting the film to a matte surface. Various additives with different refractive indices can be added to prepare films having reduced transparency or to prepare films having a translucent appearance. For extruded polyester films, additives such as silicon oxide and titanium oxide are widely used in the extrusion process to obtain translucent or white films. Coating or co-extruding a skin layer is known to enhance the semi-gloss properties over the translucent properties of a film. Additionally, it is known to utilize incompatibility between the additives and polyethylene terephthalate (PET) to create voids to prepare white film. In many cases, highly incompatible organic polymer particles such as polymethylpentane are added to produce translucency in a film.

Talc and other layered inorganic materials have been used in the plastics industry due to the ability of these materials to increase dimensional stability, flexural modulus, and impart improvement in heat distortion temperature. For polypropylene film, these materials have been used as antiblocking and/or nucleation agents. Talc has also been combined with polyurethane to facilitate crystallization of a polyurethane composition, particularly a polyester-based polyurethane composition. For example, U.S. Pat. No. 6,458,880 discloses a polyurethane composition containing polyurethane (e.g., a polyester-based polyurethane) and sufficient talc to provide a crystallization temperature of the polyurethane composition that is at least 10° C. greater than the crystallization temperature of the polyurethane composition without talc. The addition of talc can enable rapid formation of products, by for example, injection molding, compression molding, extrusion, and film formation techniques. Talc has also been used in flame retardant films as an effective material for preventing dripping such as in U.S. Pat. No. 6,174,943. The disclosures of the foregoing are incorporated herein by reference in their entirety.

Generally, talc is known to have a moderate adhesion to polyester. Further, biaxially oriented polyester films which contain talc particles are typically opaque because the incompatibility between the talc particles and polyester creates micro-voids around the particles after orientation. Accordingly, such matte films typically posses a relatively high haze number. Reducing the amount of talc in the film may reduce the amount of haze, but also increases the gloss of the matte image.

SUMMARY OF THE INVENTION

Described are methods and films for using talc as an additive to achieve a polyester film having simultaneously reduced gloss and reduced haze.

These and other features and advantages of the invention will be more fully understood from the following description of certain specific embodiments of the invention.

One embodiment is a polyester film that includes at least one sub layer comprising 0.1 to 20 wt % talc, and at least one core layer, wherein the surface layer has a lower melting point temperature than the core layer. Preferably, the film has 10 to 90 gloss at 60°. Preferably, the film has 1% to 40% haze.

Preferably, the sub layer includes at least 20 wt. % polyethylene isophthalate. Preferably, the core layer includes polyethylene terephthalate. Preferably, the film has a total light transmittance of at least 85%. Preferably, the film has a surface roughness of not more than 150 nm in SRa. Preferably, the core layer comprises talc. Preferably, the sub layer includes a greater percentage of talc relative to the percentage of talc in the core layer.

Preferably, a metal layer is deposited on the sub layer. Preferably, an ink layer is deposited on the sub layer. Preferably, the film is biaxially oriented.

Another embodiment is a method for producing a polyester film. The method includes co-extruding at least one sub layer comprising 0.1 to 20 wt % talc and at least one core layer, wherein the surface layer has a lower melting point temperature than the core layer to produce a polyester film.

Preferably, the method further includes biaxially stretching the polyester film. Preferably, the method also includes heat-setting the stretched film, wherein the heat setting temperature is between the melting point temperature of the sub layer and the melting point temperature of the core layer. Preferably, the heat setting temperature is between 410° F. to 470° F.

DETAILED DESCRIPTION

In accordance with one aspect of the invention, a polyester resin containing talc provides a laminated low haze and low gloss polyester film and method for preparing same. The films comprises at lease two layers, surface sub layer(s) and core layer(s). At least one surface sub layer comprises talc and its polymer has lower melting point than the one of core layer polymer. The laminated structures include but are not limited to AB, ABA and ABC structure.

Generally, talc is known to have a moderate adhesion to polyester. When a polyester film is stretched, microvoids, which are cavities surrounding the talc particles, are created that render the film translucent. It is believed that, due to random reflection at the film surface and interior, gloss reduction is achieved at the same time. This method comprising co-extrusion technology allows control of the gloss and transparency or haze of a film. The films may comprise two-layer or multi-layer films wherein at least one layer comprises talc and include but are not limited to ABA, AB and ABC co-extrusion, UV stabilized films, metallized films, and reverse printing applications comprising the films.

Low gloss and low haze of the polyester films can be obtained by controlling the micro-voids in the sub layer. This can be accomplished by utilizing polyester having a relatively lower melting point in the sub layer as compared to polyester in the core layer. Using the lower melting point polyester in the sub layer allows only the sub layer to partially melt during the heat setting treatment following film orientation, which decreases the micro-voids.

Figure 1:
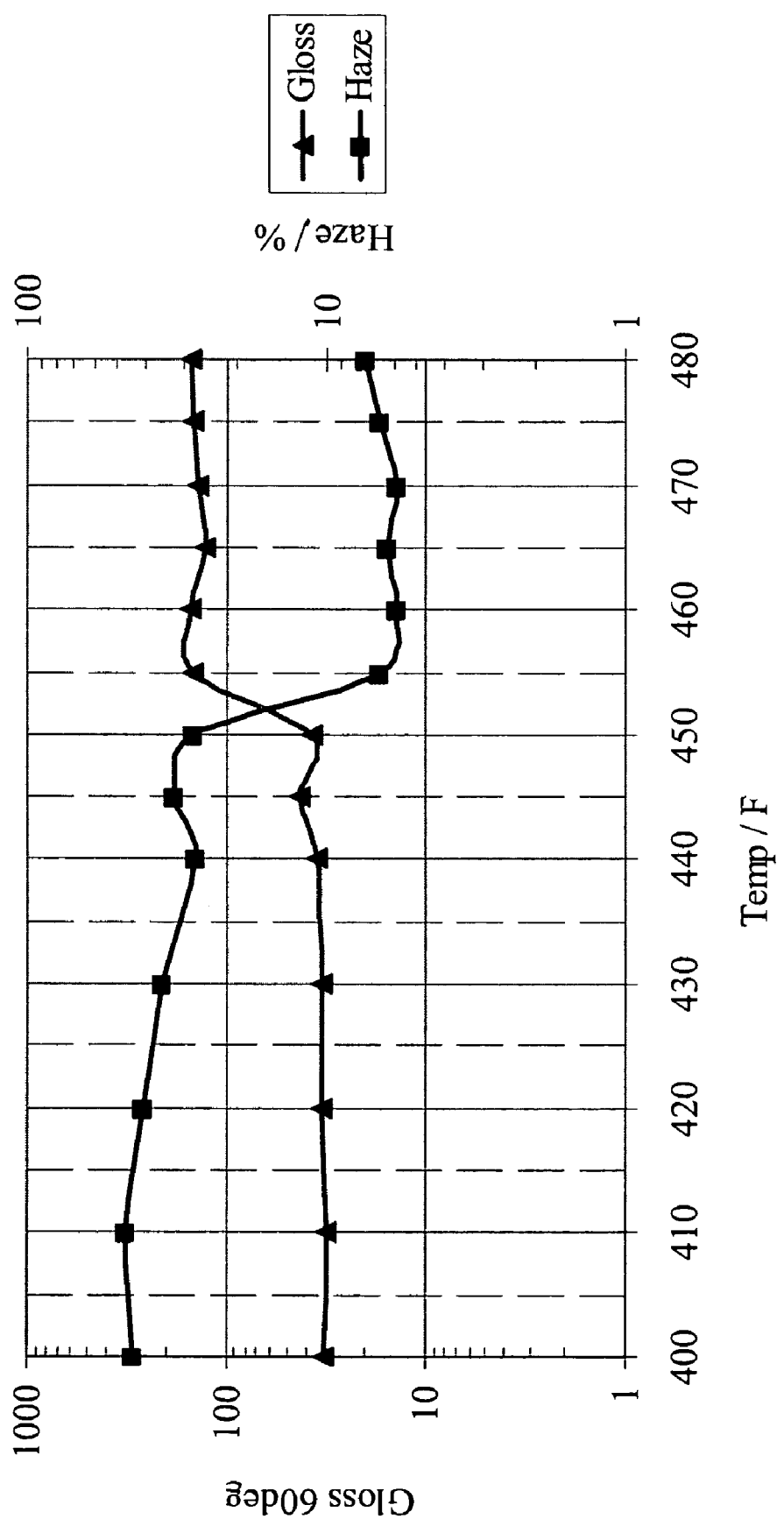
FIG. 1 shows the transition in haze and gloss of a film v. temperature.

When the heat treatment is not sufficient to melt the micro-voids surrounding the talc particles, the film haze remains high. On the other hand, the film becomes very clear and glossy when the heat treatment is too severe. As shown in FIG. 1, maintaining the film temperature in the range below the point where the sub layer entirely melts achieves a selectively and intentionally low gloss and low haze polyester film. In FIG. 1, a polyester film with talc was first prepared as a hazy film intentionally applying an inadequate heat set. Then the film was placed into a conventional oven for 2 minutes at several different temperatures. The haze and gloss were then plotted for each temperature. In FIG. 1 the point at which the sub layer entirely melts is approximately 450° F. Heat setting the film above this transition temperature results in a film with markedly increased gloss. However, just below the transition temperature, several grades of films having various ranges of gloss and haze can be obtained, just by changing the heat setting temperature of the film making process.

Adding a larger amount of a polymer having a relatively lower meting point in the sub layer can be utilized to control the melting point of the total polymer of the sub layer. Accordingly, adding a larger amount of this lower melting point polymer to the sub layer can be used to control the transition starting temperature, which is the point where the film starts transitioning from the low gloss and low haze phase to the high gloss phase.

Figure 2:
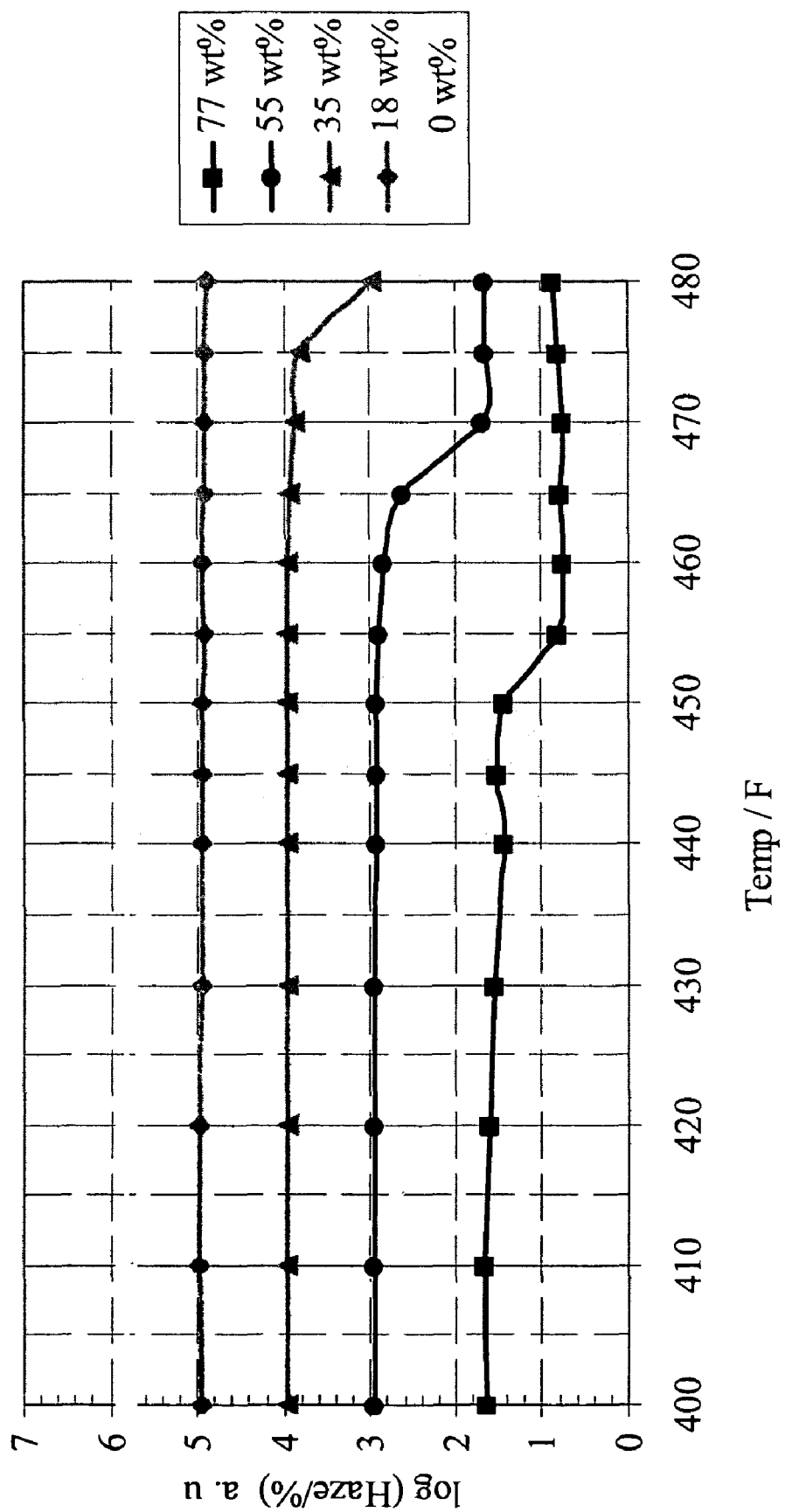
FIG. 2 shows the transition in log (haze/%) v. temperature for films including different wt % of a PET/I (polyester having lower melting point).

FIG. 2 shows the transition in log (haze/%) v. temperature for films with talc including different wt % of a PET/I (polyethylene isophthalate) a polyester having lower melting point. In FIG. 2, several films having different percentages of PET/I were prepared as hazy films by intentionally applying an inadequate heat set. As FIG. 2 shows, a higher percentage of PET/I shifts the transition starting temperature toward lower side. As mentioned above in FIG. 1, just below the transition temperature is the "sweet spot", which can be used to easily control the gloss and haze. The percentage of PET/I can be utilized to shift the "sweet" transition point (heat setting temperature) into a desirable range of 410° F. to 470° F. If the heat setting temperature is much higher than 470° F., the film becomes too crystallized to produce. If the heat setting temperature is much lower than 410° F., the film becomes less heat stable. The surface roughness of this layer can be controlled by the same method, because the size of the microvoids contributes to the protrusion of the surface.

Preferably, the film has a 10 to 90 gloss at 60° as measured by ASTM D523 More preferably, the film has a 10 to 70 gloss at 60°. Most preferably, the film has a 10 to 60 gloss at 60°.

Preferably, the film has 1% to 40% haze as measured by ASTM D1003. More preferably, the film has 1% to 35% haze. Most preferably, the film has 1% to 30% haze.

Preferably, the film has a surface roughness of not more than 150 nm in SRa as measured by the stylus method described herein.

In addition, polyester films having a lower melting point in the sub layer provide a higher TLT (total light transmittance) of the film. This is because the sub layer is less crystalline and has a lower refractive index when compared with regular oriented PET, which makes the reflection of the surface lower. Preferably, the polyester films have a TLT of at least about 85%.

In addition, lower crystallinity can produce a sub laye, which enhances adhesiveness of the surface to many types of inks.

The amount of talc particles and the thickness of the sub layer contribute to the optical properties, but the heat treatment is a major factor. Too much talc would create a highly crystallized film and make the film making process unstable.

The laminated structure allows the controlled, partially amorphous sub layer to be supported by a crystallized, thermally and mechanically stable core layer. Haze of the film can be further reduced or increased by changing the particle content of the core support layer.

The laminated polyester film may be prepared by conventional co-extrusion methods known in the art. The co-extruded talc-containing polyester film is then uniaxially oriented or, preferably, biaxially oriented such as by stretching, then heat set to form the low gloss and low haze polyester film. It is believed that the flat, plate-like talc aligns with the surface of the film and fills in the micro voids in the film right after orientation. During heat setting process which is continuous process of the orientation, when the heat treatment is not enough to sufficiently melt the micro-voids surrounding the talc particles, the film haze remains high. On the other hand, the film becomes very clear and glossy when the heat treatment is too much. Maintaining the film temperature in the range below the point where the sub layer entirely melts enables us to achieve a selectively and intentionally low gloss, low haze and smooth polyester film. We also have discovered that this method provides various types of matte films having preferable and selective appearance by just changing the heat set temperature in the film making process.

Talc is a layered or plate-like (platy) magnesium silicate having the general chemical formula $3MgO.4SiO_2.H_2O$. It is composed of alternating layers comprising MgO sandwiched between layers of $SiO_2$. These stacks of triple sheet crystalline units are held together by van der Waals forces. They are chemically inert and can be ground into platy structures. The aspect ratio (defined as the length of the particle divided by the thickness) gives an indication of platy structure. Talc can be characterized by median size and top size, with top size usually being determined using a Hegman-type gage. For example, a Hegman of 6 is a top size of 26 microns and a Hegman of 4 is a top size of 50 microns. Preferably, the talc has an average aspect ratio of at least 4 to about 50.

The gloss reduction of a platy like filler is different from spherical particles like silica. When using silica, the particle sizes and the amount are generally larger, because it is mainly a surface effect. This can be seen from the larger surface roughness of the silica filled matte film. The reduction of gloss of talc filled film is probably due to the random reflection of the talc plates in the film. The fact is that some existence of microvoids will certainly reduce the gloss. The contribution from surface roughness should not be as significant as spherical particles.

When the particle size of the talc is increased, the film has increased haze. When the particle size of the talc is decreased, the clarity of the film is increased. In this invention, the talc has a median particle size (e.g. diameter) from about 0.1 micrometer to about 20 micrometers, more preferably from about 0.5 micrometer to about 10 micrometers, and even more preferably from about 0.8 micrometer to about 5 micrometers, and most preferably 0.8 to 4 microns.

The surface of the talc plates can be modified to improve adhesion between the polymer and the talc, such as by treating with silanes, cationic polymers, stearates and the like. And to prevent the degradation of polymer with talc, any types of additive such as anti-oxidant may be used.

The preferred concentration of talc in the sub layer is from about 0.1% to about 20%, more preferably from about 0.5% to about 15%, and most preferably from about 1% to about 10%, based upon total weight of the composition of the sub layer.

The core layer may optionally comprise talc. If talc is included in the core layer, the talc is present in the core layer in an amount that is preferably less than the amount of talc in the sub layer. Especially, the AB co-extrusion provides a film having a sub (A) side that is matte and a core (B) side that is glossy.

The films may be prepared at any thickness, as desired. Preferably, the films have a total thickness of about 5 to about 500 micrometers, more preferably about 8 to about 250 micrometers.

Preferably, the thickness of the sub layer is 0.1 to 5 micrometers, more preferably 0.3 to 3 micrometer to obtain films with the preferred gloss and haze.

The sub layer and core layer may include any known polyester or combination of known polyesters. Preferred polyesters include polyethylene terephthalate (PET), polyethylene isophthalate (PET/I), polytetramethylene terephthalate, poly-1,4-cyclohexylenedimethylene terephthalate, and polyethylene-2,6-naphthalene dicarboxylate (PEN). Preferably, the polymer or the combination of the polymers of the sub layer has a lower melting point than the polymer or the combination of the polymers of the core layer. The "lower" melting point may mean a lower melting point defined by rheology and/or a lower melting point as defined as lower crystallinity, lower refractive index, more amorphous phase and so on.

Preferably, the sub layer has a 10° C. lower melting point than the core layer as defined by DSC measurements.

Desirable combinations of polymers include; PET/I or PET/I+PET for the sub layer and PET for the core layer. The addition of talc to PET films can enhance the crystallinity of the film, which can cause an unstable film making process because highly crystallized film easy to break. Amorphous PET/I reduces the crystallinity of the film. Accordingly, preferably the sub layer includes PET/I.

As the other preferable aspect of PET/I, it has lower refractive index. Lower refractive index reduces reflection on the surface, which helps create a film have a low gloss and high transparency. In addition, the amorphous surface produced provides preferable adhesive and heat sealable properties. Preferably, the sub layer includes 20 wt. % or more PET/I.

Desirable heat set temperature for this combination of polymers are preferably about 410° F. to 470° F. where the only polymer in the sub layer will melt partially to show desirable haze and gloss as well as will be very compatible to the usual film making condition to obtain reasonable mechanical properties and heat stability.

The film may contain flame retardant agent. Other materials and additives conventionally employed in the manufacturing of polyester film may be included, if desired. Such materials and additives include organic and inorganic additives. The additives include, but are not limited to, antioxidants, optical brighteners, dyes, pigments, UV absorbers, and anti-blocking agents. There are no limitations as to the particular methods for incorporating these additives into the polymer. Incorporation may be accomplished, for example, by incorporating covalently, by incorporating during polymerization, or by way of master batch.

If desired, the film can be coated by any types of functional materials, such as adhesive, anti-static, release, barrier and so on. The coating method can be chosen by any types of the methods available, such as in-line method using a bar coater, gravure coater and so on.

Another aspect of the invention comprises preparing a metallized film from the co-extruded translucent talc containing film. The co-extruded translucent talc containing film has a matte side and an opposite shiny side. If the film is metallized on the matte side, a silver matte appearance is achieved on both sides of the film. If the film is metallized on the glossy side, a shiny, mirror like appearance is achieved on one side of the film and silver matte appearance is achieved on the opposite side of the film.

In yet another aspect of the invention, a reverse printed film is provided. Polyester films are often a primary substrate for graphic applications. The clarity, dimensional stability, ability to be printed or inked, and relative low cost make polyester films a key material for various labels, signage, and other applications. Reverse printing of polyester film is a common technique utilized to bury the printed image behind the protective polyester substrate. In reverse printing, an image is literally printed in reverse and is viewed through the substrate. The clarity of polyester films often makes them a substrate of choice for this application.

Many reverse printed applications exist. For example, many durable label applications exist whereby the image being buried behind the polyester substrate increases the durability of the inked image to scratching, abrasion and moisture. Such label structures may be utilized for labeling devices used outdoors like tractors, ladders and multiple other devices. Various types of reverse printed signage media exist including different types of POT (point of purchase) signage, backlit signage, and others. Reverse printing the image affords protection of the image by the film surface. Often the image is coated with a PSA (pressure sensitive adhesive) to facilitate anchorage to a secondary substrate.

Reverse printing onto the co-extruded translucent polyester film increases the durability of the image in terms of scratch resistance while also improving the long-term stability of the image from fading due to the harmful effects of UV light within solar radiation. Preferably, particularly when intended for outdoor applications, the film will contain one or more UV absorbers.

EXAMPLES

Selected aspects of the invention will now be illustrated with reference to the following examples. Films prepared in accordance with aspects of the invention were prepared using talc, regular PET and PET/I resin in the amounts shown in the Table 1 below. The talc was compounded with the PET resin and extruded into cast film of various thicknesses. The cast film was further stretched biaxially and heat set at the temperature shown in the Table 1 in a polyester film line to obtain biaxially oriented polyester film. The films were then tested for gloss, haze and the other characteristics in the Table 3.

The mechanical properties, including tensile strength and elongation at break, were measured using a tensile tester per ASTM D-882. The thickness of the film was measured using a micrometer.

Haze of the film was measured using a Byk Gardner Haze Gard Plus Hazemeter according to ASTM D1003. It defines haze as that percentage transmitted light which in passing through the specimen deviates from the incident beam by more than 2.5 degrees on the average. Clarity is evaluated in angle ranger smaller than 2.5 degrees.

60 degree gloss of the film was measured using a Byk Gardner Trigloss meter according to ASTM D523. A film sample holder was used to tighten the film for the measurement. The sample holder was black so that any transmitted light will be absorbed.

Haze is due to wide-angle scattering—the light is diffused in all directions equally. It causes a loss of contrast and is commonly referred to as haze or milkiness. Clarity is due to narrow angle scattering. It describes how well very fine details may be resolved in an object. This is also known as see through quality. While haze is distance independent, clarity is dependent on distance. That means the greater the distance between object and transparent and transparent material the worse the see through quality (contact clarity).

For the ink adhesiveness test, two types of the water based inks, BASF FLX 5000 blue, BASF FLX 500 red were drawn down with a thickness of approximately 3 micrometer in wet on the surface of the sub layer A and the coated film was dried in a conventional oven at 150° C. for 30 seconds. Afterwards, a tape peeling test was performed using (3M610) tape. Ink adhesiveness was rated as follows:

0-10% picked off; excellent
10%-20% picked off; good
20%-30% picked off; fair
30% and more picked off; poor

Example 1

Polyester pellets as listed in Table 1 were mixed according to the blend ratio shown in Table 2, extruded using a vent-type two-screw extruder, and filtered for the sub layer (A). Pellets listed in Table 1 were mixed according to the blend ratio shown in Table 2, dried, extruded and filtered for the core layer (B). These melt streams were fed through a rectangular joining zone and laminated into a two layer co-extruded (A)/(B) structure. The resulting curtain was quenched on a casting drum, oriented in the machine direction with a roller stretcher, subsequently oriented in the traverse direction and heat-set using a chain driven stretcher under the temperature listed in Table 3, and finally wound up. The biaxially oriented polyester film had a thickness shown in Table 3 and had preferable optical properties, smooth surface of the layer (A), and excellent adhesiveness to the inks as listed in Table 3. During the manufacturing of the film, there were no process issues and the film could be wound easily without any breaks.

Examples 2 and 3

Biaxially oriented polyester films were produced in the same manner as described in Example 1 according to the blend ratios and conditions in Table 2. The film had the thicknesses shown in Table 3 and had preferable optical properties, smooth surfaces of layer (A), and excellent adhesiveness to the inks as listed in Table 3. As shown in Table 3, only a 5° F. difference in the heat setting temperature just below the transition temperature gave a big difference in the gloss and haze, with each of them were in the preferable range. During the manufacturing of the films, there were no process issues and the film could be wound easily without any breaks.

Examples 4 and 5

Biaxially oriented polyester films were produced in the same manner as described in Example 1 according to the blend ratios and conditions in Table 2. The films had the thicknesses shown in Table 3 and had preferable optical properties, smooth surfaces of layer (A) and well adhesiveness to the inks as listed in Table 3. During the manufacturing of the films, there were no process issues and the film could be wound easily without any breaks.

Comparative Example 1

A Biaxially oriented polyester film was produced in the same manner as described in Example 1 according to the blend ratios and conditions in Table 2. The film had a very high haze value, rough surface of the layer (A), and common adhesiveness to the inks as listed in Table 3, because the heat set temperature was not low enough to melt the polymer of the sub layer (A).

Comparative Example 2

A biaxially oriented polyester film was produced in the same manner as described in, Example 1, according to the blend ratios and conditions in Table 2. The film had a very high gloss value as listed in Table 3, because the heat set temperature was high enough to melt the polymer of the sub layer (A) too much.

Comparative Examples 3, 4 and 5

Biaxially oriented polyester film was produced in the same manner as described in Example 1 according to the blend ratios and conditions in Table 2. The film had a relatively high haze and gloss value. The film had lower TLT and poor adhesiveness to the inks and there was a process issue that the film could not be wound easily with many breaks, because the film comprised only PET and was highly crystallized.

The examples are summarized in Tables 1 to 3 below.

TABLE 1

Polyester pellets used in the Examples

| Pellet | Polymer | Type | Particle Size | Content |
|---|---|---|---|---|
| a | PET | Talc "FLEXTALC 310" from Kisch | 2.5 micrometer | 30 wt % |
| b | PET | (none) | (n/a) | (n/a) |
| c | PET/I | (none) | (n/a) | (n/a) |
| d | PET | Agglomerated Silica | 2.6 micrometer | 3 wt % |

TABLE 2

Blend conditions of the Examples

| | Ex. 1 | Ex. 2 | Ex. 3 | Ex. 4 | Ex. 5 | Comp. 1 | Comp. 2 | Comp. 3 | Comp. 4 | Comp. 5 |
|---|---|---|---|---|---|---|---|---|---|---|
| Sub layer A | a; 23 c; 77 | a; 23 c; 77 | a; 23 c; 77 | a; 20 b; 50 c; 30 | a; 20 b; 50 c; 30 | a; 30 c; 70 | a; 30 c; 70 | a; 15 b; 85 | a; 20 b; 80 | a; 35 b; 65 |

TABLE 2-continued

Blend conditions of the Examples

|  | Ex. 1 | Ex. 2 | Ex. 3 | Ex. 4 | Ex. 5 | Comp. 1 | Comp. 2 | Comp. 3 | Comp. 4 | Comp. 5 |
|---|---|---|---|---|---|---|---|---|---|---|
| Core layer B | b; 95 d; 5 | b; 95 d; 5 | b; 95 d; 5 | b; 95 d; 5 | b; 95 d; 5 | b; 95 d; 5 | b; 95 d; 5 | b; 95 d; 5 | b; 95 d; 5 | b; 95 d; 5 |

TABLE 3

Test conditions and properties of laminated polyester film containing talc

|  | Ex. 1 | Ex. 2 | Ex. 3 | Ex. 4 | Ex. 5 |
|---|---|---|---|---|---|
| Structure | A/B | A/B | A/B | A/B | A/B |
| Total film gauge/um | 23 | 23 | 23 | 50 | 50 |
| Gauge of layer A/um | 1.2 | 2.0 | 2.0 | 2.0 | 2.4 |
| Content of Talc in layer A/wt % | 7 | 7 | 7 | 6 | 6 |
| Content of PET/I in layer A/wt % | 77 | 77 | 77 | 30 | 30 |
| Content of PET in layer A/wt % | 16 | 16 | 16 | 64 | 64 |
| Heat setting temp/° F. | 420 | 420 | 425 | 440 | 440 |
| Gloss 60° of layer A | 50 | 45 | 75 | 52 | 52 |
| Gloss 60° of layer B | 112 | 112 | 111 | 115 | 115 |
| Haze/% | 16 | 24 | 6 | 33 | 36 |
| TLT/% | 92 | 92 | 92 | 89 | 89 |
| SRa of layer A/nm | 150 | 145 | 135 | 125 | 125 |
| Ink adhesiveness | Excellent | Excellent | Excellent | Good | Good |
| Productivity | Stable | Stable | Stable | Stable | Stable |

|  | Comp. 1 | Comp. 2 | Comp. 3 | Com. 4 | Com. 5 |
|---|---|---|---|---|---|
| Structure | A/B | A/B | A/B | A/B | A/B |
| Total film gauge/um | 23 | 23 | 23 | 23 | 23 |
| Gauge of layer A/um | 2.0 | 2.0 | 2.0 | 2.0 | 2.0 |
| Content of Talc in layer A/wt % | 9 | 9 | 4.5 | 6 | 10.5 |
| Content of PET/I in layer A/wt % | 70 | 70 | 0 | 0 | 0 |
| Content of PET in layer A/wt % | 21 | 21 | 95.5 | 94.0 | 89.5 |
| Heat setting temp/° F. | 400 | 450 | 450 | 450 | 450 |
| Gloss 60° of layer A | 34 | 130 | 67 | 63 | 50 |
| Gloss 60° of layer B | 110 | 135 | 113 | 113 | 112 |
| Haze/% | 71 | 4 | 35 | 37 | 65 |
| TLT/% | 82 | 92 | 84 | 82 | 73 |
| SRa/nm | 165 | 100 | 98 | 91 | 94 |
| Ink adhesiveness | Fair | Excellent | Poor | Poor | Poor |
| Productivity | Stable | Stable | Unstable | Unstable | Unstable |

This application discloses several numerical ranges in the text and figures. The numerical ranges disclosed are intended to support any range or value within the disclosed numerical ranges even though a precise range limitation is not stated verbatim in the specification because this invention can be practiced throughout the disclosed numerical ranges. It is also to be understood that all numerical values and ranges set forth in this application are necessarily approximate.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred to in this application are hereby incorporated herein by reference.

The invention claimed is:

1. A biaxially oriented polyester film, comprising:
   at least one sub layer comprising 0.5 to 15 wt % talc; and
   at least one core layer,
   wherein the sub layer has a lower melting point temperature than the core layer, the film is heat set following biaxial orientation at a heat set temperature that only partially melts the sub layer comprising talc, the film has 5 to 40% haze and the sub layer comprising talc has 10 to 90 gloss at 60°, and
   wherein the film has a haze transition temperature, and the film is heat set below the haze transition temperature.

2. The polyester film of claim 1, wherein the sub layer comprises polyethylene isophthalate.

3. The polyester film of claim 1, wherein the sub layer comprises at least 20 wt % polyethylene isophthalate.

4. The polyester film of claim 1, wherein the core layer comprises polyethylene terephthalate.

5. The polyester film of claim 1, wherein the film has a total light transmittance of at least 85%.

6. The polyester film of claim 1, wherein the core layer comprises talc.

7. The polyester film of claim 1, wherein the sub layer comprises a greater percentage of talc relative to the percentage of talc in the core layer.

8. The polyester film of claim 1, further comprising a metal layer deposited on the sub layer.

9. The polyester film of claim 1, further comprising an ink layer deposited on the sub layer.

* * * * *